(12) United States Patent
Yoon

(10) Patent No.: US 11,811,031 B2
(45) Date of Patent: Nov. 7, 2023

(54) BATTERY MODULE

(71) Applicant: LG Chem, Ltd., Seoul (KR)

(72) Inventor: Han Ki Yoon, Daejeon (KR)

(73) Assignee: LG Energy Solution, Ltd.

( * ) Notice: Subject to any disclaimer, the term of this patent is extended or adjusted under 35 U.S.C. 154(b) by 705 days.

(21) Appl. No.: 16/609,919

(22) PCT Filed: Nov. 6, 2018

(86) PCT No.: PCT/KR2018/013339
§ 371 (c)(1),
(2) Date: Oct. 31, 2019

(87) PCT Pub. No.: WO2019/088789
PCT Pub. Date: May 9, 2019

(65) Prior Publication Data
US 2020/0203782 A1    Jun. 25, 2020

(30) Foreign Application Priority Data

Nov. 6, 2017 (KR) .......................... 10-2017-0146776

(51) Int. Cl.
*H01M 10/48* (2006.01)
*H01M 10/42* (2006.01)
*H01M 50/209* (2021.01)

(52) U.S. Cl.
CPC ....... *H01M 10/486* (2013.01); *H01M 10/425* (2013.01); *H01M 50/209* (2021.01); *H01M 2010/4271* (2013.01)

(58) Field of Classification Search
CPC ............ H01M 10/486; H01M 10/425; H01M 2010/4271; H01M 50/20; H01M 10/4257; H01M 2200/10; Y02E 60/10
(Continued)

(56) References Cited

U.S. PATENT DOCUMENTS 9,831,536 B2    11/2017 Lim et al.
2009/0154048 A1*  6/2009 Jang .................. H01M 10/425
                                            361/106
(Continued)

FOREIGN PATENT DOCUMENTS

DE    102016203422 A1    9/2016
JP       2008298662 A   12/2008
(Continued)

OTHER PUBLICATIONS

International Search Report from Application No. PCT/KR2018/013339 dated Feb. 13, 2019, 2 pages.
(Continued)

*Primary Examiner* — Christian Roldan

(74) *Attorney, Agent, or Firm* — Lerner David LLP

(57) ABSTRACT

A battery module including a temperature sensor according to an exemplary embodiment of the present invention includes: a flexible printed circuit board where the temperature sensor is provided; a battery cell that overlaps a portion of the flexible printed circuit board, in which the temperature sensor is provided; and an upper plate that is disposed above the flexible printed circuit board, wherein the upper plate is partially cut so as to define an elastic member, and the elastic member presses the portion of the flexible printed circuit board in which the temperature sensor is provided so as to cause the flexible printed circuit board to contact the battery cell.

11 Claims, 5 Drawing Sheets

(58) Field of Classification Search
USPC .......................................................... 429/90
See application file for complete search history.

(56) References Cited

U.S. PATENT DOCUMENTS

| | | | |
|---|---|---|---|
| 2010/0247996 A1* | 9/2010 | Ijaz | H01H 85/10 |
| | | | 429/178 |
| 2012/0028083 A1* | 2/2012 | Jung | H01M 10/486 |
| | | | 429/7 |
| 2012/0169289 A1 | 7/2012 | Kim et al. | |
| 2015/0214583 A1* | 7/2015 | Lim | H01M 10/486 |
| | | | 429/90 |
| 2016/0380319 A1* | 12/2016 | Rhein | H01M 50/147 |
| | | | 429/90 |
| 2017/0194771 A1 | 7/2017 | Aoki | |
| 2017/0250395 A1 | 8/2017 | Cheon et al. | |
| 2018/0040927 A1 | 2/2018 | Rejman et al. | |
| 2018/0151859 A1 | 5/2018 | Aizawa | |
| 2019/0389318 A1* | 12/2019 | Lee | H01M 50/516 |

FOREIGN PATENT DOCUMENTS

| | | |
|---|---|---|
| JP | 2013251294 A | 12/2013 |
| JP | 2015125901 A | 7/2015 |
| KR | 20110136777 A | 12/2011 |
| KR | 20120021393 A | 3/2012 |
| KR | 20120078373 A | 7/2012 |
| KR | 20150089483 A | 8/2015 |
| KR | 20160061638 A | 6/2016 |
| KR | 20160061721 A | 6/2016 |
| KR | 20160076864 A | 7/2016 |
| WO | 2017006763 A1 | 1/2017 |

OTHER PUBLICATIONS

Extended European Search Report including Written Opinion for Application No. EP18874537.6, dated May 12, 2020, pp. 1-8.
Search Report dated Mar. 18, 2022 from the Office Action for Chinese Application No. 201880028133.6 dated Mar. 24, 2022, 3 pages.

* cited by examiner

BATTERY MODULE

CROSS-REFERENCE TO RELATED APPLICATION

This application is a national phase entry under 35 U.S.C. § 371 of International Application No. PCT/KR2018/013339, filed Nov. 6, 2018, which claims priority from Korean Patent Application No. 10-2017-0146776 filed on Nov. 6, 2017, the entire contents of which are incorporated herein by reference.

TECHNICAL FIELD

The present invention relates to a battery module, and more particularly, it relates to a battery module that includes an upper plate having an elastic member.

BACKGROUND ART

Recently, as technology development of and demand for mobile devices grow, demand for a rechargeable battery as an energy source has been rapidly increased. Accordingly, various research and studies with respect to a rechargeable battery that can fulfill various needs have been carried out.

The rechargeable battery can be classified into a cylindrical rechargeable battery, a prismatic rechargeable battery, and a pouch-type rechargeable battery, depending on the shape, and in terms of materials, there is a high demand for a lithium rechargeable battery as a lithium ion battery and a lithium ion polymer battery having high energy density and high discharge voltage as well as output stability.

The rechargeable battery continuously repeats charging and discharging, and through such a process, a large amount of heat is generated and an output voltage state of the battery may be changed. A temperature increase and an output voltage change due to the heat generation cause malfunctioning of an element that uses the corresponding battery, deteriorates operation efficiency, and shortens a life-span of the battery.

In addition, since a battery pack includes a battery module structure in which a plurality of battery cells are embedded in a pack case, a problem may occur in safety and operation efficiency of the battery pack when over-voltage, over-current, and over-heating occur in some of the battery cells. Accordingly, a temperature sensor and the like is connected to the battery cells to control the battery cells while determining an operation state of the battery cell in real time or at regular intervals. However, a temperature measurement error may occur, depending on the degree of contact of the temperature sensor with the battery cell.

DISCLOSURE

Technical Problem

Exemplary embodiments of the present invention have been made in an effort to provide a battery module in which a force is applied toward a direction of a battery cell to cause a temperature sensor to stably contact the battery cell, thereby increasing accuracy in measurement of a battery cell temperature.

However, the problems to be solved by the embodiments of the present invention are not limited to the above-mentioned problems, but can be variously extended within the scope of the technical idea included in the present invention.

Technical Solution

A battery module including a temperature sensor according to an exemplary embodiment of the present invention includes: a flexible printed circuit board where the temperature sensor is provided; a battery cell that overlaps a portion of the flexible printed circuit board, in which the temperature sensor is provided; and an upper plate that is disposed above the flexible printed circuit board, wherein the upper plate is partially cut and thus an elastic member is formed, and the elastic member presses the portion of the flexible printed circuit board in which the temperature sensor is provided and thus the battery cell and the flexible printed circuit board contact each other.

The battery module may include a compression pad that is disposed between the upper plate and the flexible printed circuit board.

The battery module may further include: a first adhesive layer that is disposed between the compression pad and the upper plate; and a second adhesive layer that is disposed between the compression pad and the flexible printed circuit board.

The first adhesive layer and the second adhesive may each be provided as a double-sided adhesive tape.

A force is applied in a direction toward the battery cell by an elastic force of the elastic member such that the temperature sensor and the battery cell may maintain a contact state.

The temperature sensor may be a thermistor.

A gap between the elastic member and the battery may be smaller than a gap between the upper plate and the battery cell.

A plurality of the battery cells may be provided, and a lamination direction of the plurality of battery cells may be parallel with a top surface of the upper plate, and the flexible printed circuit board may contact a side surface of the battery cell.

A plurality of the elastic members may be formed in the upper plate, and each elastic member may contact a different battery cell.

The compression pad may be formed of polyurethane foam.

Advantageous Effects

According to the exemplary embodiments, a battery module in which the temperature sensor is stably attached to a battery cell by applying a force toward the battery cell using an elastic member formed on the upper plate can be provided, thereby improving accuracy of temperature measurement of the battery cell.

MODE FOR INVENTION

Figure 1:
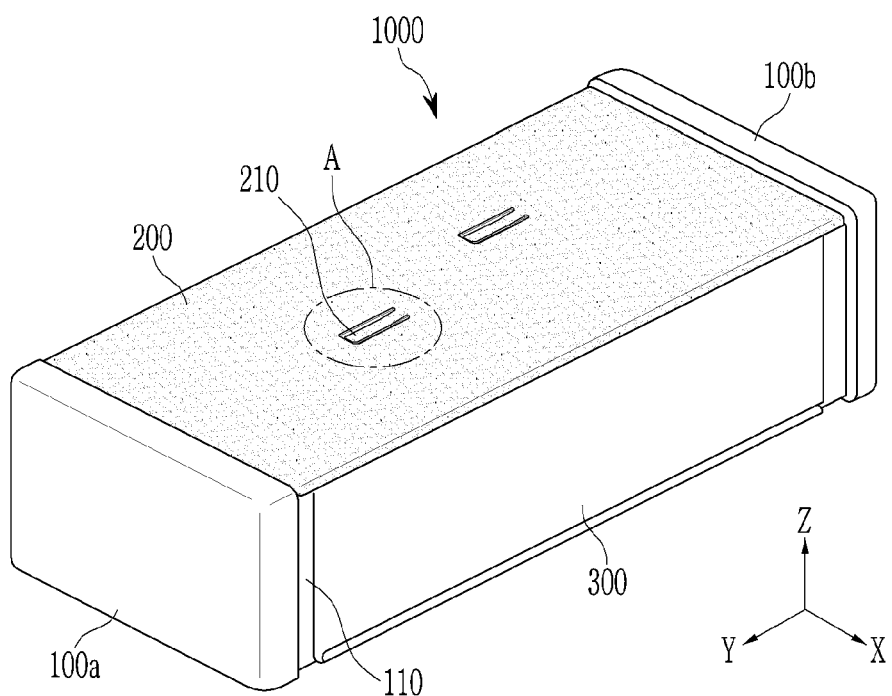
FIG. 1 is a schematic perspective view of a battery module according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, size and thickness of each element are arbitrarily represented for better understanding and ease of description, but the present invention is not limited thereto. In the drawings, the thickness of layers, films, panels, regions, etc., are exaggerated for clarity. In addition, for convenience of description and better understanding, the thickness of some of layers and regions is exaggerated in the drawings.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in this specification, the phrase "on a plane" means viewing a target portion from the top, and the phrase "on a cross-section" means viewing a cross-section formed by vertically cutting a target portion from the side.

FIG. 1 is a schematic perspective view of a battery module according to an exemplary embodiment of the present invention.

Referring to FIG. 1, a battery module 1000 according to an exemplary embodiment of the present invention includes a battery cell laminate 110, first and second end plates 100a and 100b, an upper plate 200, and a lower plate (not shown). The battery cell laminate 110 may be covered by a cell cover 300.

In the present exemplary embodiment, the upper plate 200 is partially cut such that an elastic member 210 may be formed. Multiple such elastic members 210 may be provided, and the elastic member 210 may be bent toward the battery cell laminate 110. The elastic member 210 according to the present exemplary embodiment will now be described in detail with reference to FIG. 2 to FIG. 4.

Figure 2:
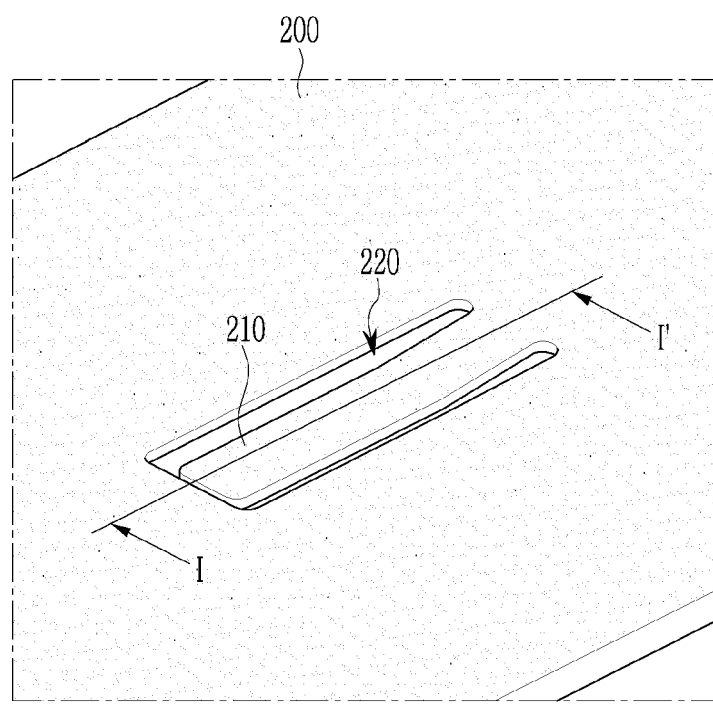
FIG. 2 is a partially enlarged view of a portion "A" in FIG. 1.
Figure 3:
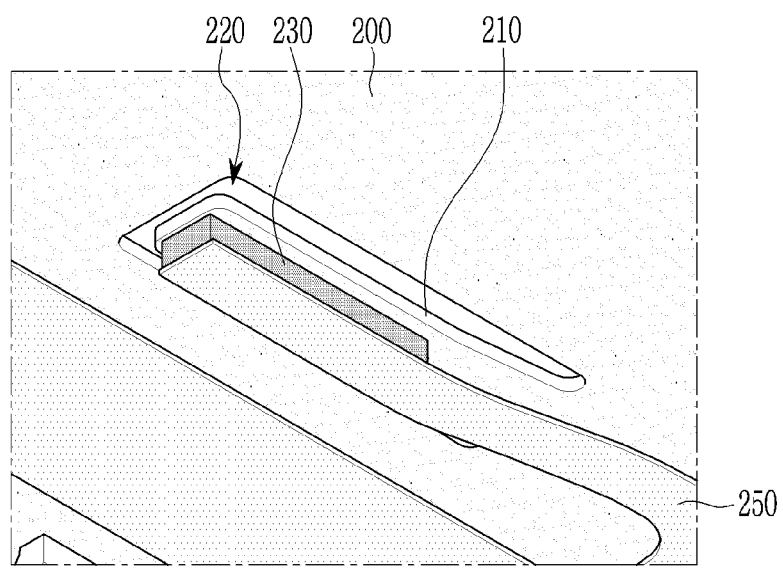
FIG. 3 is a partial schematic view of the inside of the portion "A" of FIG. 1.
Figure 4:
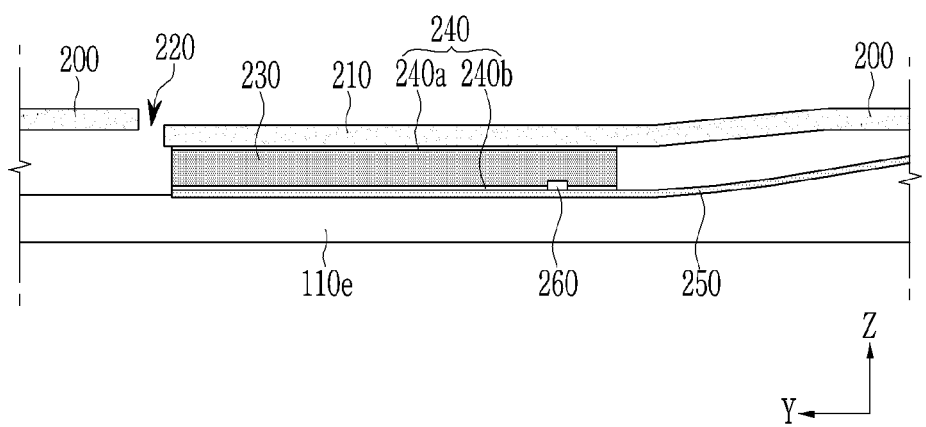
FIG. 4 is a cross-sectional view of FIG. 2, taken along the line I-I'.

FIG. 2 is a partially enlarged view of a portion A of FIG. 1. FIG. 3 schematically shows the inside of the portion A of FIG. 1. FIG. 4 is a cross-sectional view of FIG. 2, taken along the line I-I'.

Referring to FIG. 1 and FIG. 2, the elastic member 210 according to the present exemplary embodiment may be formed by partially cutting the upper plate 200. Specifically, a cutout 220 formed in the shape of "⊏" is formed in a part of the upper plate 200, and a portion of the upper plate 200 remaining in a portion surrounded by the cutout 220 becomes the elastic member 210. A plurality of such cutouts 220 may be formed in the upper plate 200, and the elastic member 210 is formed in each of the plurality of cutouts 220, and accordingly a plurality of the elastic members 210 may be provided.

Referring to FIG. 3, a flexible printed circuit board 250 is disposed at a lower end of the elastic member 210. One end of the flexible printed circuit board 250 extends along a direction in which the elastic member 210 extends, and the elastic member 210 may mostly overlap the flexible printed circuit board 250 in an x-axis direction of FIG. 1.

In the present exemplary embodiment, a compression pad 230 is disposed between the elastic member 210 and one end of the flexible printed circuit board 250. The compression pad 230 may be formed of polyurethane foam. Since the compression pad 230 is additionally formed, durability of the elastic member 210 can be improved. In addition, even when a side surface portion of the battery cell, which will be described later, is not completely parallel with a top surface of the top plate 200, an area where the flexible printed circuit board 250 and the battery cell contact each other may be increased by a cushion effect of the compression pad 230. In other words, since the compression pad 230 according to the present embodiment formed of a polyurethane foam or the like has dimensional stability, it can be used on a non-flat surface, and the compression pad 230 increases a contact surface or contactability, and has durability, thereby assuring performance despite any vibration or impact.

Referring to FIG. 4, a temperature sensor 260 is installed in the flexible printed circuit board 250 according to the present exemplary embodiment. A portion of the flexible printed circuit board 250, in which the temperature sensor 260 is installed, overlaps a battery cell 110e, which is one of battery cells included in the battery cell laminate 110 of FIG. 1 in the z-axis direction.

In the present exemplary embodiment, the elastic member 210 presses the portion of the flexible printed circuit board 250, in which the temperature sensor 260 is installed, such that the battery cell 110e and the flexible printed circuit board 250 contact each other. That is, the battery cell 110e and the flexible printed circuit board 250 directly contact each other without disposing any element between the battery cell 110e and the flexible printed circuit board 250, and thus the temperature sensor 260 can accurately measure heat and the like generated from the battery cell 110e.

Since the elastic member 210 pushes the battery cell 110e along the z-axis direction, and thus a force is applied in a direction of the battery cell 110e by an elastic force of the elastic member 210, the temperature sensor 260 and the battery cell 1102 can be stably maintained in a contact state.

Additionally, an adhesive layer 240 may be formed in each of an upper surface and a lower surface of the compression pad 230. A first adhesive layer 240a may be disposed between the compression pad 230 and the elastic member 210, and a second adhesive layer 240b may be disposed between the compression pad 230 and the flexible printed circuit board 250. The first adhesive layer 240a and the second adhesive layer 240b may be provided as a double-sided adhesive tape. The flexible printed circuit board 250 can be joined to the elastic member 210 by using such a double-sided adhesive tape.

As shown in FIG. 4, in the present exemplary embodiment, a distance between the elastic member 210 and the battery cell 110e is smaller than a distance between the upper plate 200 and the battery cell 110e.

The temperature sensor 260 may be implemented by using a thermistor. The thermistor is a semiconductor with resistance that changes in response to a temperature, and may be formed by mixing and sintering an oxide such as copper, manganese, nickel, cobalt, chromium, iron, and the like. Such a thermistor is advantageous in that it is small in size and can measure a fast temperature change and a fine temperature change.

Temperature information measured by the temperature sensor 260 can be transmitted to other devices outside of the battery module. For example, when a temperature is measured by the temperature sensor 260, the measured temperature information is transmitted to a battery management system (BMS) outside of the battery module and thus may be used to control the battery module. For this, the battery module may include a cable for temperature measurement (not shown) of which one end is connected to the temperature sensor 260. A connector may be provided at the other end of the cable, and the connector may be connected with an external device such as the BMS.

Figure 5:
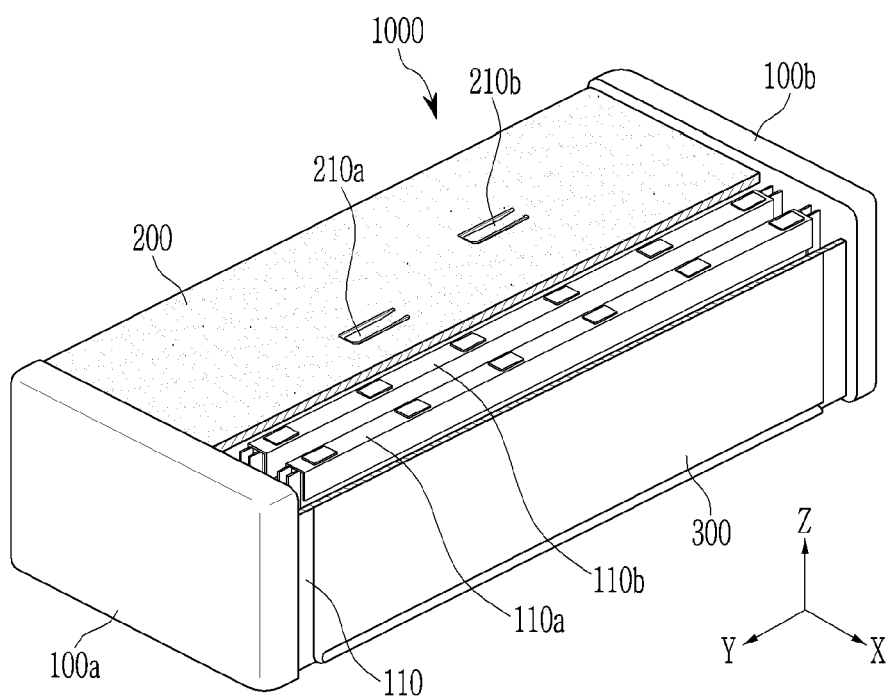
FIG. 5 is a perspective view of an array of a plurality of battery cells by exposing the upper plate in FIG. 1.

FIG. 5 is a perspective view of a plurality of battery cell arrays exposed by partially exposing the upper plate in FIG. 1.

Referring to FIG. 5, the battery cell laminate 110 of FIG. 1 includes a plurality of battery cells 110*a* and 110*b*, and a direction in which the plurality of battery cells 110*a* and 110*b* are arranged may be an X-direction that is parallel with the top surface of the upper plate 200. The battery cells 110*a* and 110*b* may each be formed in the shape of a rectangle having a length in a Y-axis direction and a width in a Z-axis direction.

As described above, two or more elastic members 210*a* and 210*b* are formed in the upper plate 200, and each of the two elastic members 210*a* and 210*b* may press the flexible printed circuit board that contacts a side surface of another battery cell.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

- 1000: battery module
- 210: elastic member
- 220: cutout
- 230: compression pad
- 240: adhesive layer
- 250: flexible printed circuit board
- 260: temperature sensor

The invention claimed is:

1. A battery module, comprising:
a flexible printed circuit board having a sensor portion in which a temperature sensor is positioned on an upper surface of the flexible printed circuit board;
a battery cell extending below the sensor portion of the flexible printed circuit board;
an upper plate disposed above the flexible printed circuit board, the upper plate being partially cut so as to define an elastic member; and
a compression pad disposed between the elastic member of the upper plate and the sensor portion of the flexible printed circuit board,
wherein the elastic member applies a downward biasing force on the compression pad, which causes the compression pad to press the sensor portion of the flexible printed circuit board against a contact area of the battery cell, and wherein the compression pad is deformable under the downward biasing force so as to conform to the contact area of the battery cell.

2. The battery module of claim 1, further comprising:
a first adhesive layer disposed between the compression pad and the upper plate; and
a second adhesive layer disposed between the compression pad and the flexible printed circuit board.

3. The battery module of claim 2, wherein the first adhesive layer and the second adhesive each comprise a double-sided adhesive tape.

4. The battery module of claim 1, wherein the downward biasing force applied by the elastic member is an elastic force directed toward the battery cell that causes the temperature sensor and the battery cell to remain in contact.

5. The battery module of claim 1, wherein the temperature sensor is a thermistor.

6. The battery module of claim 1, wherein a distance between the elastic member and the battery is smaller than a distance between the upper plate and the battery cell.

7. The battery module of claim 1, wherein a plurality of the battery cells are provided, wherein a lamination direction of the plurality of battery cells is parallel with a top surface of the upper plate, and wherein the flexible printed circuit board contacts a side surface of the battery cell.

8. The battery module of claim 7, wherein the upper plate is partially cut in multiple locations so as to define a plurality of the elastic members, and wherein each elastic member contacts a respective different battery cell.

9. The battery module of claim 1, wherein the compression pad is formed of polyurethane foam.

10. The battery module of claim 1, wherein the compression pad is formed of a foam material.

11. The battery module of claim 1, wherein the downward biasing force applied by the elastic member induces the sensor portion of the flexible printed circuit board to conform to the contact area of the battery cell.

* * * * *